(12) United States Patent
Childs et al.

(10) Patent No.: US 10,110,126 B2
(45) Date of Patent: Oct. 23, 2018

(54) ELECTROMAGNETIC INTERFERENCE (EMI) FOR PULSE FREQUENCY MODULATION (PFM) MODE OF A SWITCHING REGULATOR

(71) Applicant: Dialog Semiconductor (UK) Limited, London (GB)

(72) Inventors: Mark Childs, Swindon (GB); Tiago Patrao, Swindon (GB); Pietro Gallina, Swindon (GB); Alexandre Tavares, Swindon (GB); Michele De Fazio, Germering (DE)

(73) Assignee: Dailog Semiconductor (UK) Limited, London (GB)

( * ) Notice: Subject to any disclaimer, the term of this patent is extended or adjusted under 35 U.S.C. 154(b) by 0 days.

(21) Appl. No.: 14/845,381

(22) Filed: Sep. 4, 2015

(65) Prior Publication Data
US 2017/0070145 A1 Mar. 9, 2017

(51) Int. Cl.
*H02M 3/158* (2006.01)
*H02M 1/44* (2007.01)
*H02M 3/156* (2006.01)

(52) U.S. Cl.
CPC ............. *H02M 3/158* (2013.01); *H02M 1/44* (2013.01); *H02M 3/156* (2013.01)

(58) Field of Classification Search
CPC .... H02M 3/158; H02M 3/156; H02M 3/1563; H02M 3/157; H02M 2001/0012; H02M 2001/0009
USPC ................................ 323/222, 271, 282–285
See application file for complete search history.

(56) References Cited

U.S. PATENT DOCUMENTS

| | | | |
|---|---|---|---|
| 6,204,649 B1 | 3/2001 | Roman | |
| 7,893,663 B2 | 2/2011 | Ng | |
| 8,901,905 B2 * | 12/2014 | Fayed | H02M 3/156 323/271 |
| 2004/0183511 A1 * | 9/2004 | Dening | H02M 3/156 323/282 |
| 2013/0051089 A1 | 2/2013 | Pan et al. | |
| 2014/0111174 A1 | 4/2014 | Shtargot et al. | |
| 2016/0141956 A1 * | 5/2016 | Dong | H02M 3/157 323/271 |

(Continued)

OTHER PUBLICATIONS

Co-pending U.S. Patent DS12-051, U.S. Appl. No. 14/262,986, filed Apr. 28, 2014, "A Multiple Output Offset Comparator," by Mark Childs, 56 pgs.

*Primary Examiner* — Nguyen Tran
(74) *Attorney, Agent, or Firm* — Saile Ackerman LLC; Stephen B. Ackerman

(57) ABSTRACT

A circuit and method providing switching regulation configured to provide a pulse frequency modulation (PFM) mode of operation with reduced electromagnetic interference (EMI) comprising an output stage configured to provide switching comprising a first and second transistor, a sense circuit configured to provide output current information sensing from an output stage and a current limit reference, a first digital-to-analog converter (DAC) configured to provide signal to the current limit reference, an adder function configured to provide a signal to the first digital-to-analog converter (DAC), and a linear shift feedback register (LSFR) configured to provide a signal to an adder function followed by the first digital-to-analog converter (DAC), and the LSFR receives a clock signal from said output stage.

18 Claims, 10 Drawing Sheets

(56) References Cited

U.S. PATENT DOCUMENTS

2016/0172980 A1* 6/2016 Byun .................. H02M 3/156
                                                    323/284

* cited by examiner

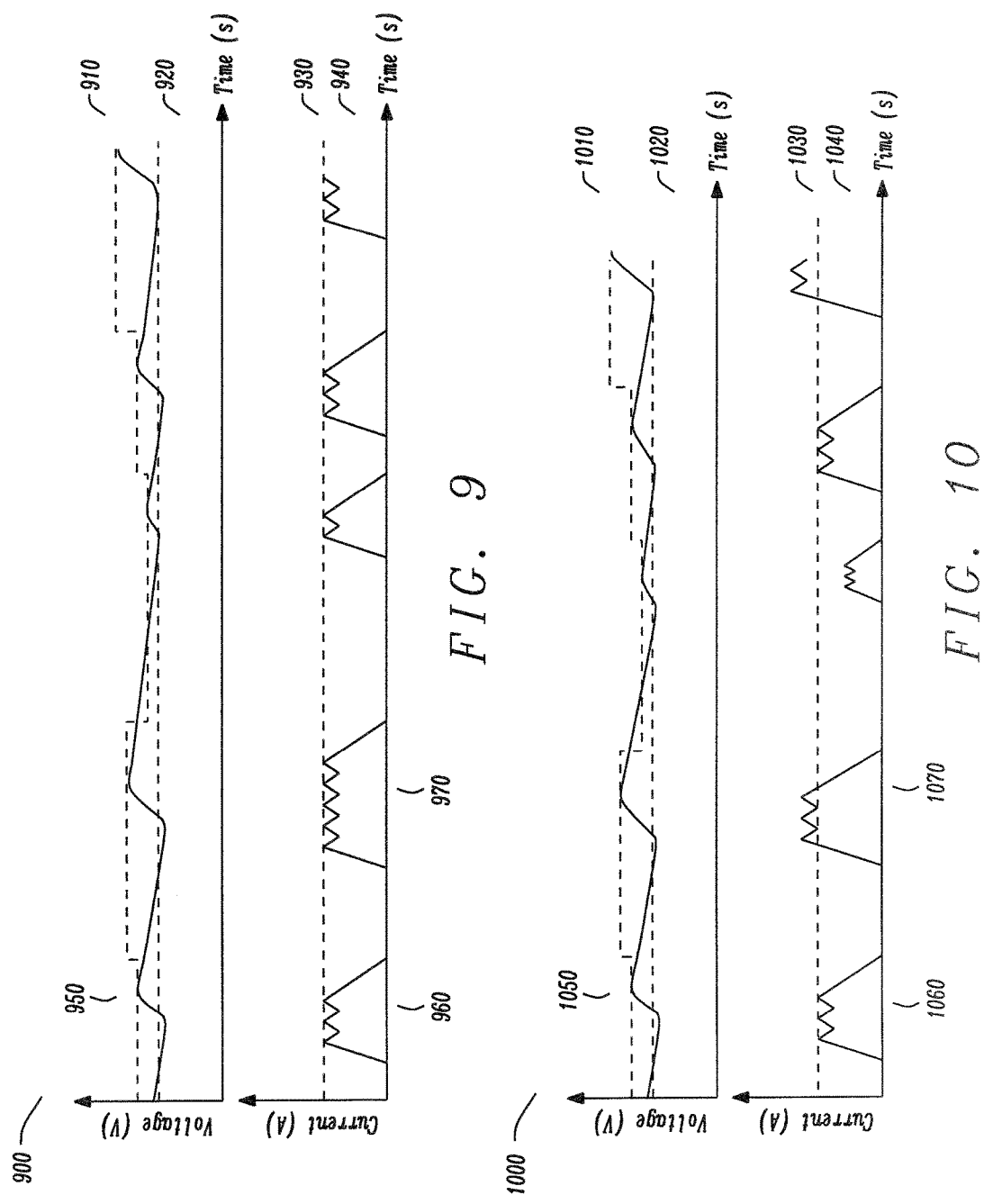

1100 ⟶

1200 — Providing a circuit with an output stage, a sense circuit, a digital-to-analog converter (DAC), an adder, and a linear shift frequency register (LSFR)

1300 — Generating a signal from the output stage

1400 — Clocking the linear shift register (LSFR) with a signal from the output stage 1500 — Generating a pseudo-random signal from the linear shift register (LSFR)

1600 — Mixing the pseudo-random signal from the linear shift register (LSFR) with a current limit value with an adder 1700 — Providing the adder signal to the digital-to-analog converter (DAC) to the current limit reference for power spectrum distribution

FIG. 11

ELECTROMAGNETIC INTERFERENCE (EMI) FOR PULSE FREQUENCY MODULATION (PFM) MODE OF A SWITCHING REGULATOR

RELATED PATENT APPLICATION

This application is related to application Ser. No. 14/262,986, titled "Dual Output Offset Comparator", filed on Apr. 28, 2014, which is assigned to a common assignee, and which is herein incorporated by reference in its entirety.

BACKGROUND

Field

The disclosure relates generally to a buck voltage regulator and, more particularly, to a buck voltage converter operating in pulse frequency modulation (PFM) mode thereof.

Description of the Related Art

Voltage regulation is important where circuits are sensitive to transients, noise and other types of disturbances. The control of the regulated voltage over variations in both semiconductor process variation, and temperature is key to many applications. Additionally, the noise generation from switching noise emissions from inductors can impact sensitive circuitry and lead to system level issues in real systems, and applications. Electromagnetic interference (EMI) is a growing concern in electronic components and systems.

EMI is a concern in voltage converter circuitry for buck, boost, and buck-boost converters, and more particularly for circuitry operating in pulse frequency modulation (PFM) mode. The PFM mode of operation is commonly used in "sleep mode" in direct current-to-direct current (DC-to-DC) converters. Buck converters can operate in two modes, known as pulse frequency modulation (PFM) mode, and pulse width modulation (PWM) mode. The PFM mode is typically used for low load currents. In a buck converter output driver stage, there is typically a p-channel metal oxide semiconductor (PMOS) transistor pull-up device, and an n-channel metal oxide semiconductor (NMOS) transistor pull-down device. In PFM mode of operation, the buck converter turns on the PMOS transistor when the output voltage falls below the digital-to-analog converter (DAC) voltage. In the buck converter, the PMOS transistor is then turned off when the current in the inductor coil reaches a threshold value (e.g., the "sleep current limit"). The NMOS is turned on when the PMOS is turned off. The NMOS is then turned off when the current in the coil is fully discharged. PFM is not typically used for large currents as the current limit is normally set low to maximize efficiency.

FIG. 1 shows a circuit schematic block diagram of a buck control system for pulse frequency mode (PFM) sleep mode. The buck 100 is composed of a power supply VDD 101, and ground VSS 102. The output driver stage comprises a PMOS pull-up transistor 105 and NMOS pull-down transistor 110. The PMOS transistor 105 has a gate driver 115 and the NMOS transistor 110 has a gate driver 120. The gate drivers are driven by a control logic block 125 which receives signals Vunder 126 and Ilimit 127. The output stage of the PMOS transistor 105 and the NMOS transistor 110 provides current to inductor Lout 150, with the current sensed by sense circuit 130. The sense circuit 130 provides a feedback signal line 132 for the Ilimit signal flag 127, based on a current limit reference Ilimit_ref provided by current source 135. Voltage LX 140 connected at the input to inductor Lout 150, connected to output capacitor 155 and output signal Vout 160. The output of the pass devices 105 and 110 are connected directly to the LX node 140. The sense block detects the current flowing through the LX; this outputs a scaled replica of this output current to the reference current source 135. If the sensed current is higher than the reference current, the voltage at node 132 will fly high and be detected by the control block 125. The output signal Vout 160 is connected to the feedback loop 165 configured to provide the signal Vfb 171 to comparator 170. A digital-to-analog converter (DAC) 175 is configured to provide a signal Vdac 173 to the comparator 170. When the output voltage falls below the DAC voltage 173 the Vunder signal 126 is raised. This turns on the PMOS transistor 105 which charges up the current in the inductor coil 150. When the inductor coil current reaches the current limit, the Ilimit flag 127 is raised. This turns off the PMOS transistor 105 and turns on the NMOS transistor 110. Once the inductor coil current reaches zero, the NMOS transistor 110 turns off, and the output goes high-impedance. The cycle is started again once the output voltage again falls below the DAC voltage 173.

FIG. 2 shows the timing diagram 200 for the signals for this mode of operation. The feedback voltage Vfb 210 and digital-to-analog converter output voltage Vdac 220 are overlaid in the timing diagram 200. The comparator output signal Vunder 230 is shown below highlighting the transitions associated with the comparator input signals. FIG. 2 shows the p-channel MOS (PMOS) gate signal Pgate 240, n-channel MOS (NMOS) gate signal N gate 250 as well as the current limit signal Ilimit 260 and inductor coil current Icoil 270.

The feedback voltage Vfb 171 is equal to the output voltage of the buck converter 160. As this falls below the digital-to-analog converter (DAC) voltage Vdac 173 the under-voltage signal Vunder 126 turns on. This leads to the turn on of the PMOS gate (active low), which causes the inductor coil current to increase. Once this reaches the current limit, the PMOS 105 turns off and the NMOS 110 turns on. The inductor coil current then discharges. Once this is fully discharged, the NMOS 110 is turned off. The output voltage 160 then discharges with the applied load until the feedback voltage Vfb 171 once again falls below the DAC voltage Vdac 173.

As the load increases so the frequency with which the buck converter switches also increases. The frequency of the buck converter can vary from very low frequencies (less than 1 Hz) up to the maximum frequency of the buck converter, determined by minimum on time and minimum off time. This can be typically around 5 MHz.

The change in current in the coil of the buck tends to emit noise which is picked up by surrounding circuits. This noise can be the source of issues within real systems and applications. Electromagnetic interference (EMI) can lead to both soft failures and hard failure. Soft failures can include timing impact, false signals, and system disturbs. Hard failure can be damage to internal devices or components that are destructive.

U.S. Patent Application 20140111174 to Shtargot et al describes a switching regulator with a split inductor for reduction of electromagnetic interference (EMI).

U.S. Patent Application 20130051089 to Pan et al., describes a frequency jittering control circuit for a PFM power supply includes a pulse frequency modulator to generate a frequency jittering control signal to switch a power switch to generate an output voltage. The frequency jittering control circuit jitters an input signal or an on-time or off-time of the pulse frequency modulator to jitter the switching frequency of the power switch to thereby improve EMI issue.

U.S. Pat. No. 7,893,663 to Ng, describes a method and apparatus for active power factor correction with sensing the line voltage. This utilizes a power factor correction apparatus which uses Pulse Frequency Modulation (PFM) to control an AC/DC converter. The switching frequency varies with the line voltage such that the converter emulates a resistive load. By using PFM control, EMI is spread over a range rather than concentrated at a few frequencies U.S. Pat. No. 6,204,649 to Roman describes using a switching regulator for reducing electromagnetic interference (EMI) includes a PWM controller which incorporates a varying frequency oscillator for controlling the operating frequency of the switching regulator.

In these prior art embodiments, the solution to establish a switching regulator with reduced EMI utilized various alternative solutions.

SUMMARY

It is desirable to provide direct current-to-direct current (DC-to-DC) converter which uses an inductor coil at the output.

It is desirable to provide voltage regulator which operates in pulse frequency modulation (PFM) mode.

It is desirable to provide a voltage converter which turns off the p-channel metal oxide semiconductor (PMOS) of the output stage when the current in the inductor coil reaches a current limit.

Another further object of the present disclosure is to provide a voltage converter which minimizes electromagnetic interference (EMI) emissions.

Another further object of the present disclosure is to provide a voltage converter in PFM mode of operation (e.g. sleep mode) which minimizes electromagnetic interference (EMI) emissions.

In summary, a power converter, comprising an output stage configured to provide switching comprising a first and second transistor, a sense circuit configured to provide output current information sensing from said output stage and a current limit reference, and a linear shift feedback register (LSFR) configured to reduce electromagnetic interference (EMI) emitted by said power converter by spreading the emission spectrum. Further, a power converter providing switching regulation is configured to provide a pulse frequency modulation (PFM) mode of operation with reduced electromagnetic interference (EMI) comprising an output stage configured to provide switching comprising a first and second transistor, a sense circuit configured to provide output current information sensing from an output stage and a current limit reference, a first digital-to-analog converter (DAC) configured to provide signal to the current limit reference, an adder function configured to provide a signal to the first digital-to-analog converter (DAC), and a linear shift feedback register (LSFR) configured to provide a signal to an adder function followed by the first digital-to-analog converter (DAC) and the LSFR receives a clock signal from said output stage.

Additionally, in summary, a circuit providing switching regulation configured to provide a pulse frequency modulation (PFM) mode of operation with reduced electromagnetic interference (EMI) comprising a linear shift feedback register (LSFR) configured to generate a pseudo-random distribution around a nominal average programmed limit, an output stage configured to provide switching, a sense circuit configured to provide output current information sensing from the output stage and a current limit reference, a first digital-to-analog converter (DAC) configured to provide signal to the current limit reference; and, an adder function configured to provide a signal to said first digital-to-analog converter (DAC).

Additionally, in summary, a circuit providing switching regulation configured to provide a pulse frequency modulation (PFM) mode of operation with reduced electromagnetic interference (EMI) comprising a linear shift feedback register (LSFR) configured to generate a pseudo-random distribution around a nominal signal, an adder function configured to receive a signal from the linear shift feedback register (LSFR) and the nominal signal, a first digital-to-analog converter (DAC) configured to provide an offset signal, a second digital-to-analog converter (DAC) providing a DAC output voltage, and, a comparator configured to compare a feedback signal, and a DAC output voltage from the second digital-to-analog converter.

In addition, a method is disclosed in accordance with the embodiment of the disclosure. A method of providing a reduced electromagnetic interference (EMI) power distribution in a switching regulator in pulse frequency mode (PFM) of operation comprising a first step (a) providing a circuit with an output stage, a sense circuit, a digital-to-analog converter (DAC), an adder, and a linear shift frequency register (LSFR), a second step (b) generating a signal from the output stage, a third step (c) clocking the linear shift register (LSFR) with a signal from the output stage, a fourth step (d) generating a pseudo-random signal from the linear shift register (LSFR), a fifth step (e) mixing the pseudo-random signal from the linear shift register (LSFR) with a current limit value with an adder, and lastly, a sixth step (f) providing the adder signal to the digital-to-analog converter (DAC) to the current limit reference for power spectrum distribution.

Other advantages will be recognized by those of ordinary skill in the art.

BRIEF DESCRIPTION OF THE DRAWINGS

The present disclosure and the corresponding advantages and features provided thereby will be best understood and appreciated upon review of the following detailed description of the disclosure, taken in conjunction with the following drawings, where like numerals represent like elements, in which:

FIG. 9 is a voltage and current versus time plot in accordance with the second embodiment of the disclosure;

FIG. 10 is a voltage and current versus time plot in accordance with a combination of the first and second embodiments of the disclosure; and, FIG. 11 is a method in accordance with the first embodiment of the disclosure.

DETAILED DESCRIPTION

Figure 1:
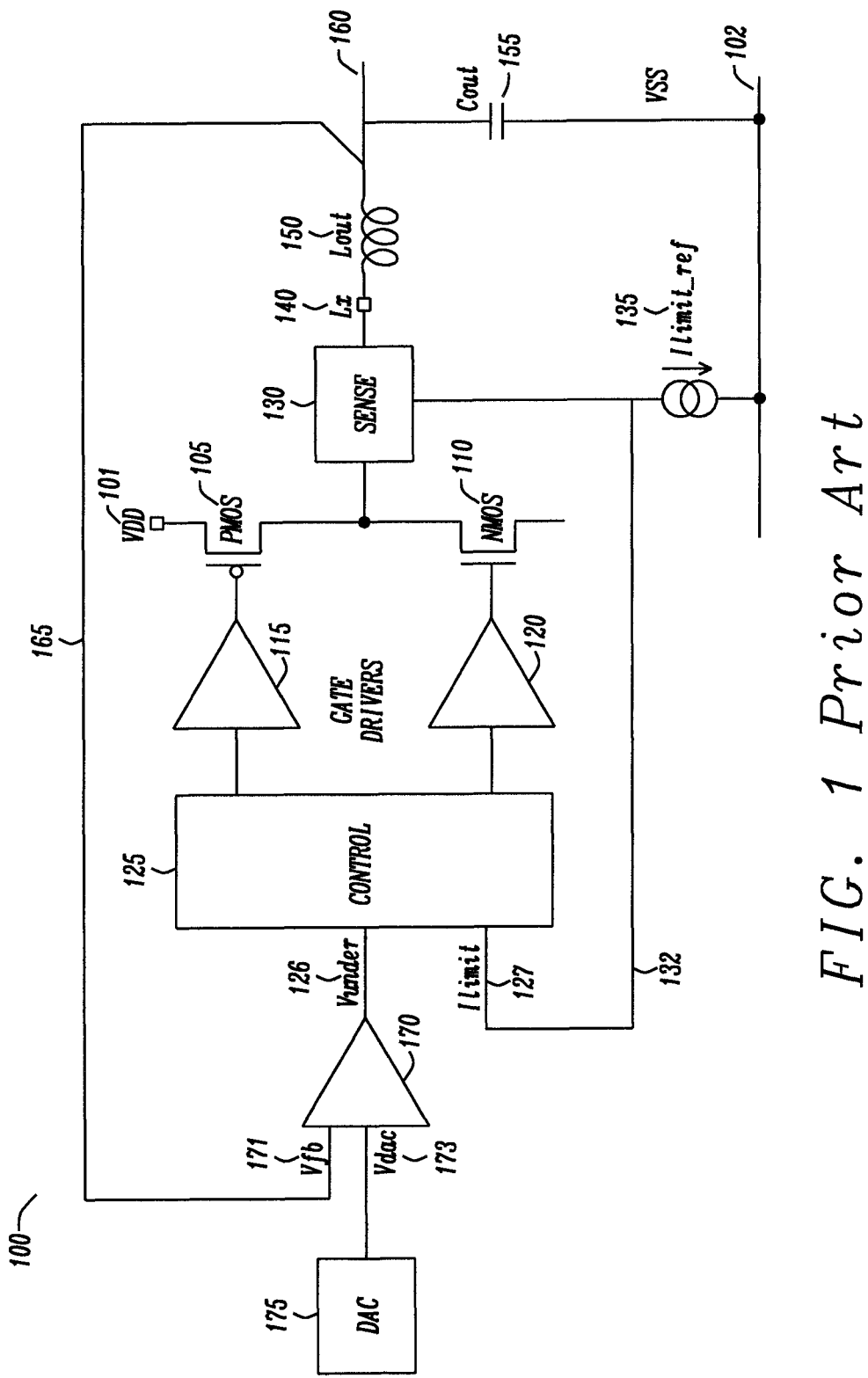
FIG. 1 is a circuit schematic of a block diagram of a switching regulator.
Figure 2:
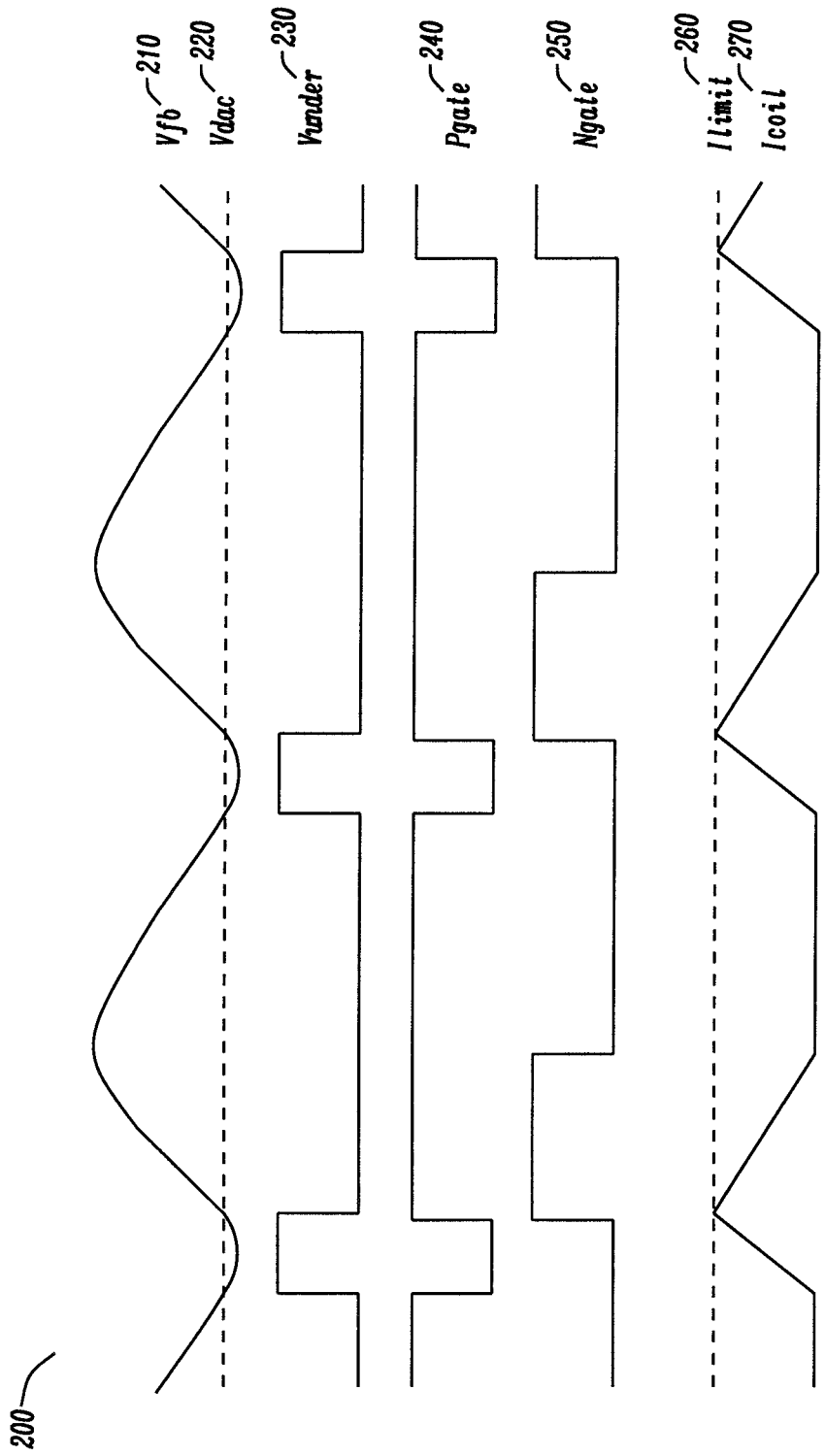
FIG. 2 is a timing diagram of a switching regulator.
Figure 3:
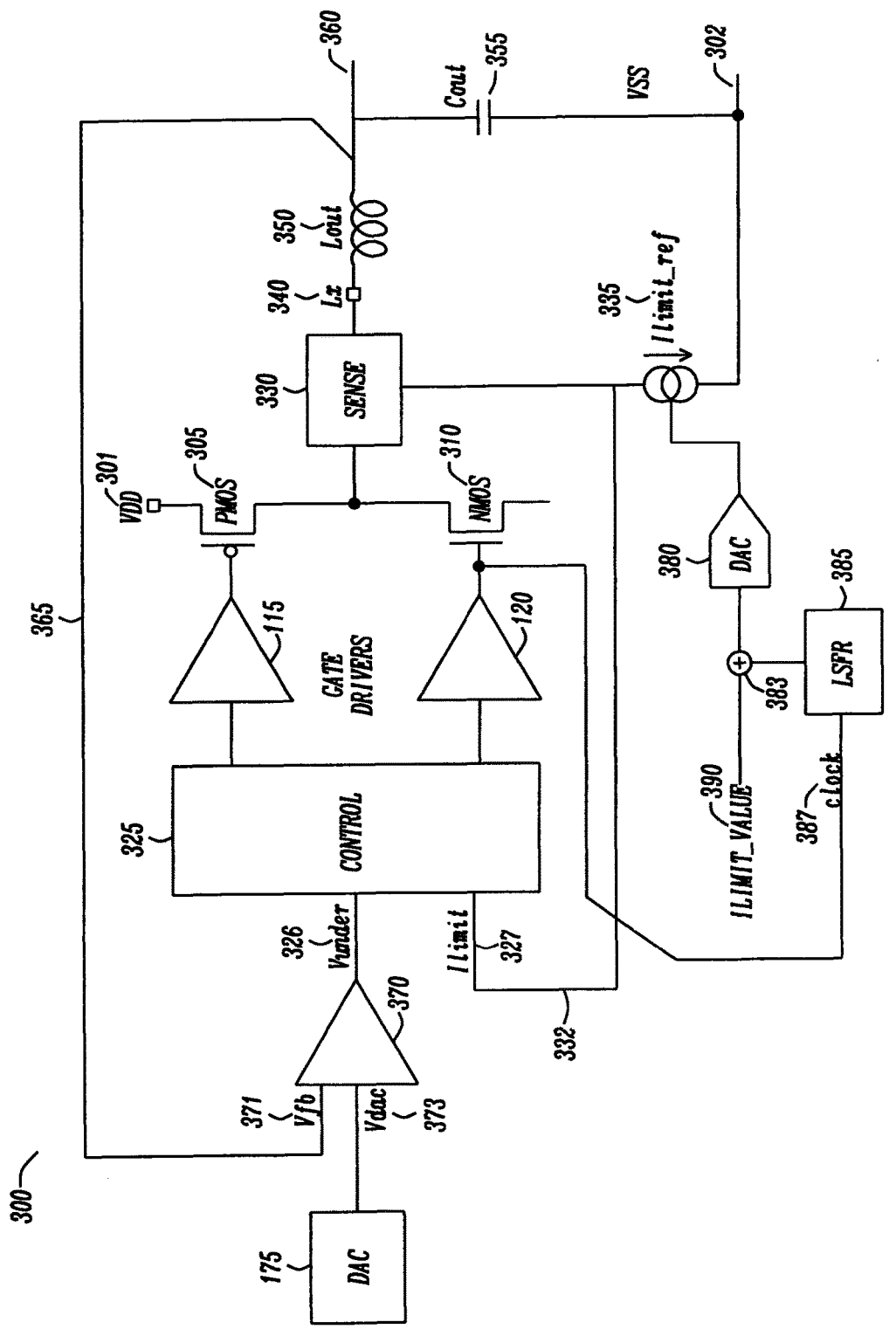
FIG. 3 is a circuit schematic in accordance with the first embodiment of the disclosure.

FIG. 3 is a circuit schematic in accordance with a first embodiment of the disclosure. In this embodiment, the current in the inductor coil is charged up linearly to the current limit. The p-channel MOS (PMOS) transistor is then turned off and the current falls linearly until the inductor coil is completely discharged. At this time, the current then remains zero until the cycle is restarted. The frequency of the buck converter can be defined by the load current divided by the charge the buck converter voltage outputs in one pulse (the area under the coil current curve). If the current limit is fixed, then the charge delivered in one pulse is also fixed (for a given operating condition ie. supply voltage, output voltage and coil value). Therefore, for a given load current the frequency of the buck is fixed. If this frequency coincides with a sensitive frequency for the application then the noise emitted may disturb the application.

It is therefore beneficial to reduce the amount of power the emitted noise (e.g. EMI) contains at the sensitive frequency. This can be done by spreading the power spectrum of the emitted noise, emitting the same total power overall, but over a wider range of frequencies.

To achieve this the current limit in sleep mode is jittered. This can be done in a random or pseudo-random fashion. This can be done at a fixed frequency, or synchronized with the switching frequency.

FIG. 3 is a circuit schematic in accordance with a first embodiment of the disclosure that provides this capability. FIG. 3 shows a circuit schematic block diagram of a buck control system for pulse frequency mode (PFM) sleep mode. The buck 300 is composed of a power supply VDD 301, and ground VSS 302. The output driver stage comprises a PMOS pull-up transistor 305 and NMOS pull-down transistor 310. The PMOS transistor 305 has a gate driver 315 and the NMOS transistor 310 has a gate driver 320. The gate drivers are driven by a control logic block 325 which receives signals Vunder 326 and limit 327. The output stage of the PMOS transistor 305 and the NMOS transistor 310 is connected to the sense circuit 330. The sense circuit 330 provides a current limit flag 327 via feedback signal line 332, based on current limit reference Ilimit_ref from programmable current source 335. The sense circuit 330 has at its output voltage LX 340. The sense circuit 330 is connected to inductor Lout 350, output capacitor 355 and output voltage Vout 360. The output signal Vout 360 is connected via feedback loop 365 to provide the signal Vfb 371 to comparator 370. A first digital-to-analog converter (DAC) 375 is configured to provide a signal Vdac 373 to the comparator 370. When the output voltage falls below the DAC voltage 373 the Vunder signal 326 is raised. This turns on the PMOS transistor 305 which charges up the current in the inductor coil 350. When the inductor coil current reaches the current limit, the Ilimit flag is raised. This turns off the PMOS transistor 305 and turns on the NMOS transistor 310. Once the inductor coil current reaches zero, the NMOS transistor 310 turns off, and the output goes high-impedance. The cycle is started again once the output voltage again falls below the DAC voltage 373. The current limit in the buck is set by a current limit reference block designated having as an input ILIMIT_VALUE 390. This block acts as a DAC (a second DAC 380) to convert an input code into an analogue current limit proportional to that code. For example, the DAC controls the programmable current source 335 to generate the current limit reference Ilimit_ref proportional to the input code. The code is supplied by a function that generates a pseudo-random distribution around the nominal average programmed current limit. The pseudo random function is generated in turn by a Linear Shift Feedback Register (LSFR) 385 (also known as a Linear Feedback Shift Register, LFSR) which provides a signal to an adder (e.g. adder function) 383. LSFR 385 generates a very long repeating sequence of pseudo-random numbers, used to offset the nominal current limit value by a number of bits. A Linear Shift Feedback Register (LSFR), also known as a Linear Feedback Shift Register (LFSR), is a shift register whose input bit is a linear function of its previous state in the register. For example, the most commonly used linear function of single bits is an exclusive-or (XOR). An LFSR is a shift register whose input bit is driven by the exclusive-or (XOR) from some of the bits in the shift register. An LFSR, with a well-chose feedback function can produce a sequence of bits which appear random. LSFR applications include generating pseudo-random numbers, pseudo-noise sequences, and whitening sequences. There are different types of LSRFs, such as Fibonacci LFSRs and Galois LFSRs. An LFSR in Galois configuration is also known as modular, internal XORs, as well as one-to-many LFSRs.

The LSFR 385 is clocked using either a fixed clock or, in this case, the clocking of the PFM buck itself, synchronizing the new current limit with the pass-device PMOS turn-off. The clock signal 387 is configured to electrically connect to the n-channel MOS (NMOS) 310.

Figure 4:
FIG. 4 shows power spectrum versus frequency in the frequency domain in accordance with the first embodiment of the disclosure.
Figure 4:
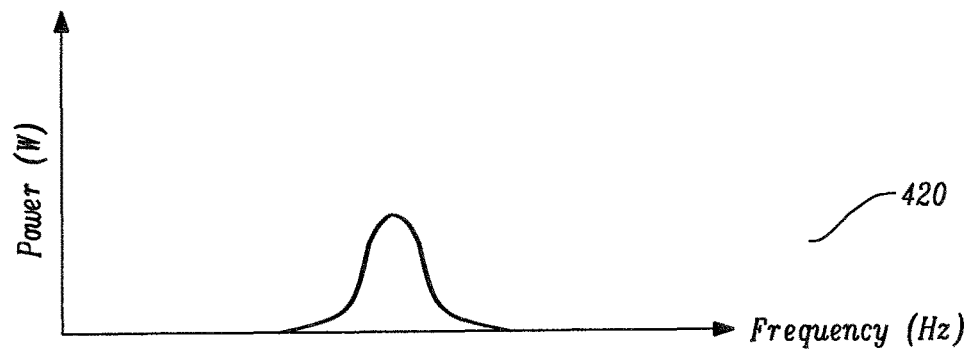

FIG. 4 is a power spectrum (versus frequency) in the frequency domain in accordance with the first embodiment of the disclosure. FIG. 4 illustrates the power spectrum, Power (W) as a function of Frequency (Hz) 400. This scheme will take a single tone on the Fast Fourier Transform (FFT) and spread it to create a more Gaussian distribution, reducing the peak power at the fundamental frequency. The first diagram 410 shows a single tone at the switching frequency of the buck. The second diagram 420 shows the effect of this current limit jitter on the FFT, spreading the noise and reducing the peak power at any frequency.

Figure 5:
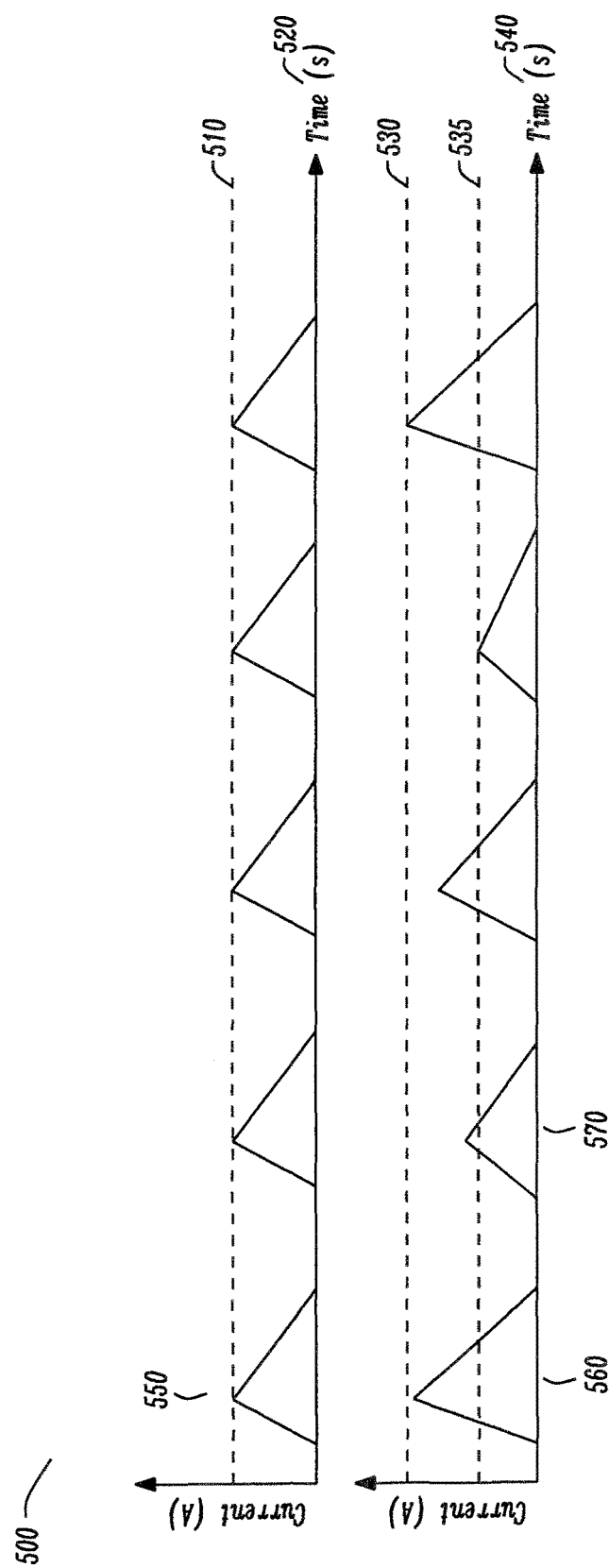
FIG. 5 is a current versus time plot in the time domain in accordance with the first embodiment of the disclosure.

FIG. 5 is a current versus time plot in the time domain. FIG. 5 illustrates the current vs time 500 for a first and second trace. In the first trace 520, the current in the inductor coil of the buck converter is shown for a normal PFM mode. Here the load is constant value, and the buck converter switches regularly to support the current. Each pulse sees the coil current rise linearly to the current limit 510 and then fall to zero. The current limit 510 is constant, and so each pulse 550 is identical and evenly spaced.

In the second trace 540, in accordance with the first embodiment of the disclosure, the current limit is varied with time between the two extreme values 530 and 535 as indicated. The pulses 560 and 570 are therefore different heights each time, and the spacing between them also varies. A higher pulse 560 delivers more charge, and the load therefore takes longer to discharge it. A smaller pulse 570 delivers less charge, and the next pulse is therefore sooner. The frequency of this second trace is no longer constant.

Figure 6:
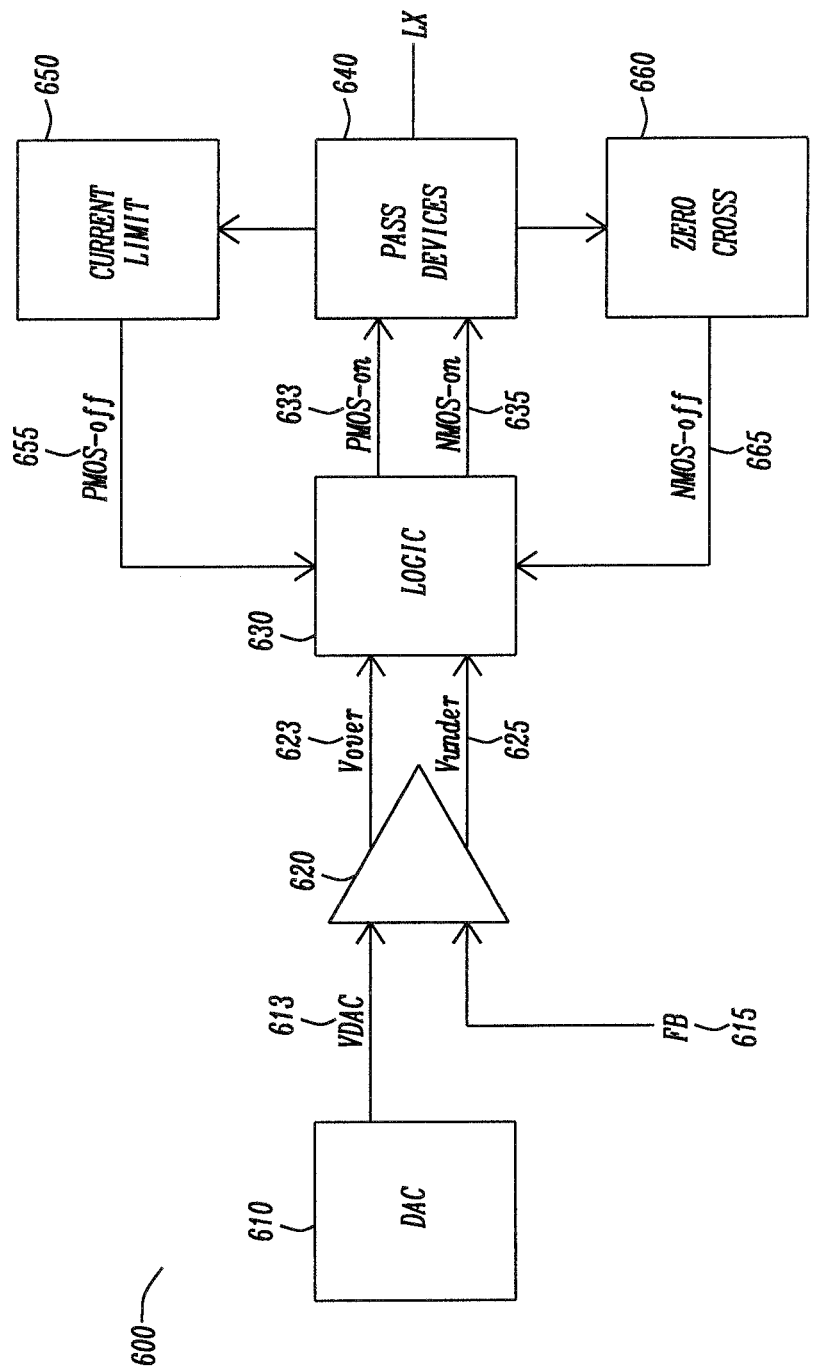
FIG. 6 is a circuit schematic block diagram of a switching regulator known to the inventor.

FIG. 6 is a circuit schematic block diagram known to the inventor of the disclosure. The circuit schematic block diagram 600 illustrates a digital-to-analog converter (DAC) 610 providing a signal VDAC 615 in parallel with feedback signal FB to the comparator 620. The output of the comparator 620 provides an over-voltage signal Vover 623 and under-voltage signal Vunder 625 to logic block 630. The pass devices block 640 is configured to provide a signal to the current limit block 650 and zero-cross block 660. The output of the current limit block 650 is configured to provide a signal PMOS-off 655 to the logic block 630. The output of the zero cross block 660 is configure to provide a signal NMOS-off 665 to the logic block 630. The output of the logic block 630 provides a signal PMOS-on 633 and NMOS-on 635 to the pass devices 640.

In the FIG. 6 circuit, an alternative pulse frequency modulation (PFM) scheme is used. In this scheme, the PFM system is altered so that the pass-devices 640 begin to switch each time the output voltage falls lower than the DAC voltage. The pass-devices 640 then continue to switch at a fixed frequency or to a fixed current limit until the output voltage rises above an upper threshold value.

The current limit in this case is set low enough that the pass-devices 640 must switch more than once in order to reach this upper threshold output voltage. Once this upper threshold is met, the pass-devices 640 stop switching and the output is high impedance until the output voltage falls below the DAC voltage once again.

In this PFM scheme, the frequency of pulses within each burst is fixed, but the frequency at which the bursts occur is now variable. This form of PFM switches with a frequency set by the difference between the upper and lower thresholds of the comparator (between the DAC voltage and the upper threshold voltage).

The jitter scheme described earlier may be applied to this circuit. In this case, instead of adding jitter to the current limit itself, the jitter is added to the offset between the DAC voltage and the upper threshold voltage. So each time the pass-devices stop switching (the output voltage passes the upper threshold) the offset is adjusted to a new value, around the nominal offset value. This will change the delay before the next burst of switching activity.

This scheme may also be combined with the current limit scheme, so that a smaller offset is combined with a lower current limit. This will ensure that each burst contains a similar number of pulses, which may help keep the system working in the correct mode.

Figure 7:
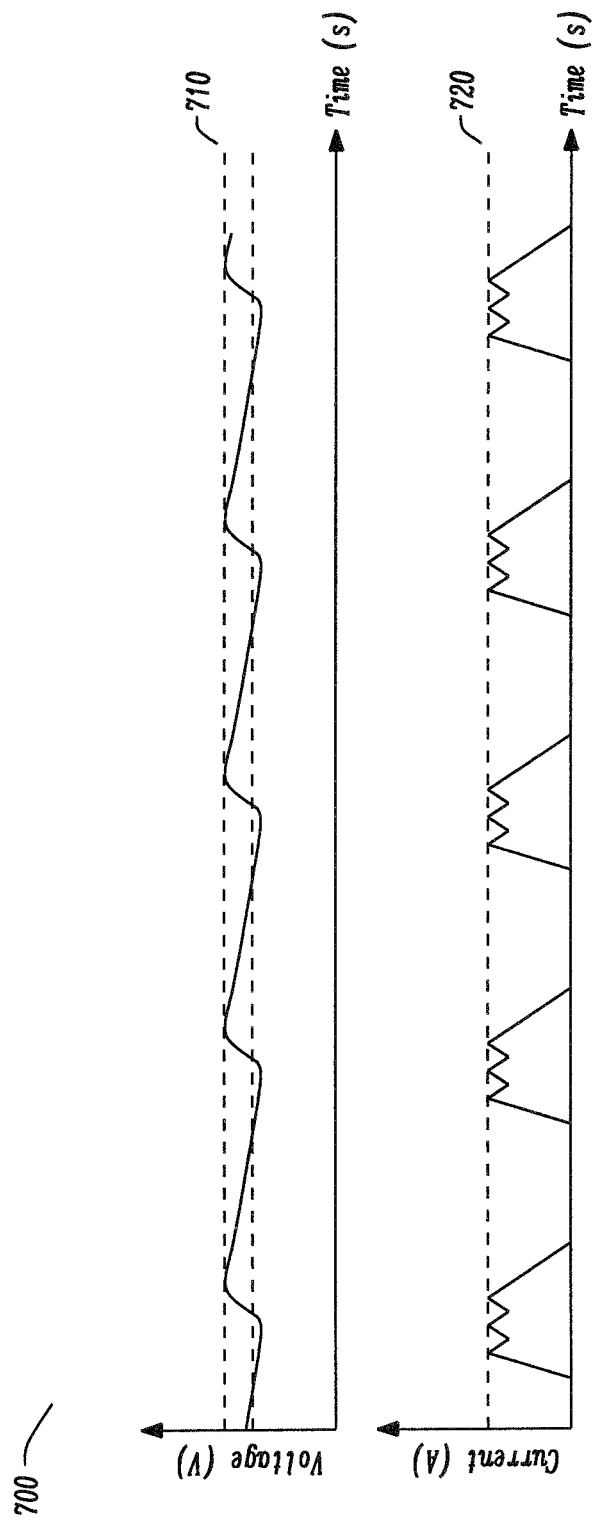
FIG. 7 is a voltage and current versus time plot in accordance with the FIG. 6 switching regulator.

FIG. 7 is a voltage and current versus time plot for the FIG. 6 circuit. The timing plot 700 shows the voltage as a function of time 710. From the voltage waveform, the implementation of FIG. 6 constrains the voltage within an upper and lower bound. The timing plot 700 also illustrates the current waveform 720 as a function of time. In this implementation, the current waveform 720 for each pulse is identical in shape, magnitude and spacing.

Figure 8:
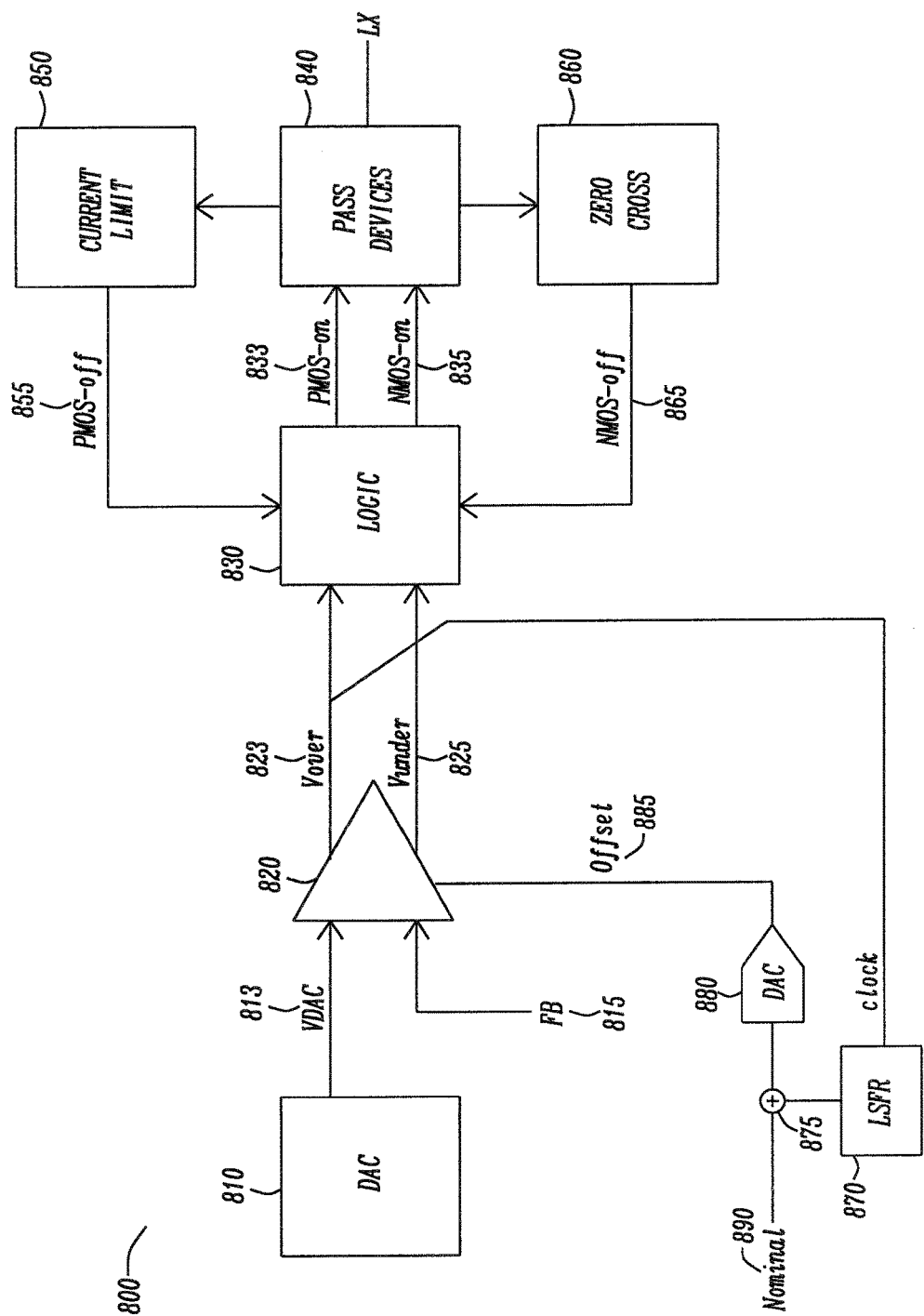
FIG. 8 is a circuit schematic in accordance with a second embodiment of the disclosure.

FIG. 8 is a circuit schematic in accordance with a second embodiment of the disclosure. Similar to the first embodiment of the disclosure, a Linear Shift Frequency Register (LSFR) block is used, to modify the nominal comparator offset value. This may be done in a purely analog fashion. For example, in the current embodiment the offset is added by adding an offset current to the second stage of a comparator. The system would then vary this current with the LSFR code to adjust the offset current. FIG. 8 illustrates this implementation. The circuit schematic block diagram 800 illustrates a digital-to-analog converter (DAC) 810 providing a signal VDAC 815 in parallel with feedback signal FB to the comparator 820. The output of the comparator 820 provides an over-voltage signal Vover 823 and under-voltage signal Vunder 825 to logic block 830. The pass devices block 840 is configured to provide a signal to the current limit block 850 and zero-cross block 860. The output of the current limit block 850 is configured to provide a signal PMOS-off 855 to the logic block 830. The output of the zero cross block 860 is configure to provide a signal NMOS-off 865 to the logic block 830. The output of the logic block 830 provides a signal PMOS-on 833 and NMOS-on 835 to the pass devices 840. The signal Vover 823 is configured to provide a clock signal for the LSFR block 870. The output of the LSFR block 870 is provided for the adder functional block 875. The nominal signal 890 and the LSFR block signal are mixed in the adder functional block 875. The adder functional block provides an input to the second DAC 880. The output of the DAC 880 provides signal offset 885 to the comparator 820.

FIG. 9 is a voltage and current versus time plot in accordance with the second embodiment of the disclosure. The waveforms 900 for voltage as a function of time 920 and current as a function of time 940 are illustrated. The stepwise variable upper voltage limit 910 can be used in conjunction with a fixed lower voltage limit 915, to shift the hysteresis value of comparator 820. Alternately upper limit 910 could be held constant and lower limit 915 varied. The current limit 930 as shown is a constant fixed current limit. The voltage 950 corresponds to the first current waveform 960, and the second waveform 970.

FIG. 10 is a voltage and current versus time plot in accordance with a combination of the first and second embodiments of the disclosure. The voltage and current waveforms 1000 are illustrated. The voltage waveform 1020 illustrates the voltage as a function of time, with limits 1010. The current waveform 1040 illustrates the current as a function of time, with current limit 1030. If this system were modified to vary the current limit at the same time as the offset then the waveform as illustrated in FIG. 10 would be achieved. In this case, the number of pulses in each burst is roughly constant. This scheme ensures each burst contains more than one pulse, which can be helpful for system stability. Note that in this implementation, the current pulse waveform for pulse 1060 and pulse 1070 have different limits.

FIG. 11 is a method in accordance with the first embodiment of the disclosure. A method 1100 of providing a reduced electromagnetic interference (EMI) power distribution in a switching regulator in pulse frequency mode (PFM) of operation comprising a first step 1200 (a) providing a circuit with an output stage, a sense circuit, a digital-to-analog converter (DAC), an adder, and a linear shift frequency register (LSFR), a second step 1300 (b) generating a signal from the output stage, a third step 1400 (c) clocking the linear shift register (LSFR) with a signal from the output stage, a fourth step 1500 (d) generating a pseudo-random signal from the linear shift register (LSFR), a fifth step 1600 (e) mixing the pseudo-random signal from the linear shift register (LSFR) with a current limit value with an adder, and lastly, a sixth step 1700 (f) providing the adder signal to the digital-to-analog converter (DAC) to the current limit reference for power spectrum distribution.

It should be noted that the description and drawings merely illustrate the principles of the proposed methods and systems. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the proposed methods and systems and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Other advantages will be recognized by those of ordinary skill in the art. The above detailed description of the disclosure, and the examples described therein, has been presented for the purposes of illustration and description. While the principles of the disclosure have been described above in connection with a specific device, it is to be clearly understood that this description is made only by way of example and not as a limitation on the scope of the disclosure.

What is claimed is:

1. A power converter running in a pulse frequency modulation (PFM) mode, comprising:
an output stage configured to provide switching comprising a first and second transistor;
a controller configured to switch between said first and second transistors based on a current limit;
a sense circuit configured to provide output current information sensing from said output stage and a current limit reference;
a clocked current limit jitter block configured to offset the current limit reference value by a sequence of pseudo-random numbers spreading an emission spectrum, wherein an output of the clocked current limit jitter block is an input to an adder function block, wherein the clocked current limit jitter block comprises a linear shift feedback register (LSFR) receiving a clock signal from said output stage; and
the adder function configured to add the output of the clocked current limit jitter block to the current limit reference value and to provide a signal to a first digital-to-analog converter (DAC).

2. The power converter of claim 1, wherein said linear shift feedback register (LSFR) configured to reduce electromagnetic interference (EMI) emitted by said power converter by spreading the emission spectrum.

3. The power converter of claim 2, wherein said linear shift feedback register (LSFR) generates a pseudo-random distribution around a nominal average programmed limit.

4. The power converter of claim 1, wherein said first digital-to-analog converter (DAC) configured to provide signal to the current limit reference.

5. The power converter of claim 1, providing switching regulation configured to provide a pulse frequency modulation (PFM) mode of operation with reduced electromagnetic interference (EMI).

6. The power converter of claim 1, wherein said output stage comprises a p-channel MOS (PMOS) transistor and an n-channel MOS (NMOS) transistor.

7. The power converter of claim 1, further comprising a gate driver circuit configured to provide gate current to said output stage.

8. The power converter of claim 7, further comprising a control logic block to provide switching signals to the gate driver circuit.

9. The power converter of claim 8, further comprising an inductor configured to receive a signal from said sense circuit and provide a feedback signal.

10. The power converter of claim 1, further comprising a second digital-to-analog converter (DAC) configured to provide a second DAC voltage.

11. The power converter of claim 10, further comprising a comparator circuit configured to receive a feedback signal and second DAC voltage and providing an under-voltage output voltage.

12. A method of providing a reduced electromagnetic interference (EMI) power distribution in a switching regulator in pulse frequency mode (PFM) of operation comprising the steps of:
providing a circuit with an output stage, a sense circuit, a digital-to-analog converter (DAC), an adder, and a functional block;
generating a signal from said output stage;
clocking said functional block with a signal from said output stage;
generating a pseudo-random signal from said functional block;
mixing said pseudo-random signal from said functional block with a current limit value with an adder; and
providing the adder signal to the digital-to-analog converter (DAC) to the current limit reference for power spectrum distribution.

13. The method of claim 12 wherein said functional block is a Linear Shift Frequency Register (LSFR) block.

14. The method of claim 12, wherein the circuit further comprising:
a feedback loop, a second digital-to-analog converter (DAC), a comparator, a control functional block, gate drivers, and an inductor coil.

15. The method of claim 14, further comprising the steps of:
feeding a feedback signal through said feedback loop from said inductor coil;
generating a digital-to-analog converter (DAC) voltage signal from said second DAC;
comparing said feedback signal and said second DAC voltage signal;
generating a under-voltage signal from said comparator; and
generating a current limit signal from said sense circuit.

16. The method of claim 14, further comprising the steps of:
feeding an under-voltage signal and current limit signal to said control functional block;
applying voltage signals to the gate driver functional blocks for switching;
feeding switching signals to the output stage;
switching said output stage based on the switching signals; and
providing the clock signal to the linear switching feedback register (LSFR) from said output stage state.

17. The method of claim 16, wherein said output stage comprises of a p-channel MOS (PMOS) transistor, and a n-channel MOS (NMOS) transistor.

18. A method of providing a reduced electromagnetic interference (EMI) power distribution in a switching regulator in pulse frequency mode (PFM) of operation comprising the steps of:
providing a circuit with an output stage, a sense circuit, a digital-to-analog converter (DAC), an adder, and a linear shift frequency register (LSFR);
generating a signal from said output stage;
clocking said linear shift register (LSFR) with a signal from said output stage;
generating a pseudo-random signal from said linear shift register (LSFR);

mixing said pseudo-random signal from said linear shift register (LSFR) with a current limit value with an adder; and providing the adder signal to the digital-to-analog converter (DAC) to the current limit reference for power spectrum distribution.

\* \* \* \* \*